(12) United States Patent
Koike et al.

(10) Patent No.: US 10,875,105 B2
(45) Date of Patent: Dec. 29, 2020

(54) CUTTING INSERT

(71) Applicant: SUMITOMO ELECTRIC HARDMETAL CORP., Hyogo (JP)

(72) Inventors: Yusuke Koike, Itami (JP); Yuta Morisaki, Itami (JP); Yasuyuki Kanada, Itami (JP); Atsuhiko Maeta, Itami (JP); Tomoyuki Fukuyama, Itami (JP); Yoshinari Nagami, Itami (JP)

(73) Assignee: Sumitomo Electric Hardmetal Corp., Itami (JP)

(*) Notice: Subject to any disclaimer, the term of this patent is extended or adjusted under 35 U.S.C. 154(b) by 139 days.

(21) Appl. No.: 16/333,520

(22) PCT Filed: Dec. 27, 2016

(86) PCT No.: PCT/JP2016/088912
§ 371 (c)(1),
(2) Date: Mar. 14, 2019

(87) PCT Pub. No.: WO2018/070058
PCT Pub. Date: Apr. 19, 2018

(65) Prior Publication Data
US 2019/0255621 A1 Aug. 22, 2019

(30) Foreign Application Priority Data
Oct. 14, 2016 (JP) ................ 2016-202652

(51) Int. Cl.
*B23C 5/20* (2006.01)
*B23C 5/06* (2006.01)
(52) U.S. Cl.
CPC ............. *B23C 5/20* (2013.01); *B23C 5/06* (2013.01); *B23C 5/205* (2013.01);
(Continued)

(58) Field of Classification Search
CPC ......... B23C 2200/0411; B23C 2200/08; B23C 2200/085; B23C 2200/125;
(Continued)

(56) References Cited

U.S. PATENT DOCUMENTS 4,645,384 A * 2/1987 Shimomura .......... B23C 5/2243
407/42
4,755,086 A * 7/1988 Stashko ................ B23B 27/145
407/114

(Continued)

FOREIGN PATENT DOCUMENTS

| EP | 0682584 | 8/1994 |
| JP | H09-174323 A | 7/1997 |
| WO | 2015/174200 A1 | 11/2015 |

*Primary Examiner* — Nicole N Ramos
(74) *Attorney, Agent, or Firm* — Baker Botts L.L.P.; Michael A. Sartori

(57) ABSTRACT

A cutting edge has a corner cutting edge, a flat drag, and a main cutting edge. The rake surface has a first rake surface portion, a second rake surface portion, and a third rake surface portion. The first rake surface portion has a first inclined surface inclined at a first angle. The second rake surface portion has a second inclined surface inclined at a second angle greater than the first angle. The first end portion and the second end portion are higher than the reference surface in a direction perpendicular to the reference surface, and the main cutting edge extends so as to intersect the reference surface when viewed in a direction parallel to the reference surface. A first step portion rising from the third rake surface portion and continuous with the first rake surface portion is provided on the rake surface.

13 Claims, 10 Drawing Sheets

(52) U.S. Cl.
CPC .... *B23C 2200/08* (2013.01); *B23C 2200/125* (2013.01); *B23C 2200/286* (2013.01)

(58) Field of Classification Search
CPC ........ B23C 2200/286; B23C 2200/208; B23C 2200/28; B23C 5/00; B23C 5/06; B23C 5/02; B23C 5/20; B23C 5/205; B23C 5/207
See application file for complete search history.

(56) References Cited

U.S. PATENT DOCUMENTS

| | | | |
|---|---|---|---|
| 5,544,984 A * | 8/1996 | Pantzar | B23C 5/207 407/113 |
| 5,803,674 A | 9/1998 | Satran et al. | |
| 5,810,521 A * | 9/1998 | Pantzar | B23B 27/145 407/114 |
| 8,777,524 B2 * | 7/2014 | Choi | B23C 5/109 407/42 |
| 10,213,851 B2 * | 2/2019 | Koike | B23C 5/2243 |
| 2006/0198707 A1 | 9/2006 | Sheffler et al. | |
| 2008/0304924 A1 * | 12/2008 | Engstrom | B23C 5/202 407/114 |
| 2012/0070242 A1 * | 3/2012 | Choi | B23C 5/109 407/113 |
| 2013/0251464 A1 * | 9/2013 | Hecht | B23C 5/2221 407/48 |
| 2014/0010605 A1 * | 1/2014 | Smilovici | B23C 5/207 407/42 |
| 2016/0082528 A1 * | 3/2016 | Ballas | B23C 5/06 407/48 |
| 2016/0375506 A1 | 12/2016 | Koike et al. | |
| 2019/0283148 A1 * | 9/2019 | Koike | B23C 5/06 |

\* cited by examiner

CUTTING INSERT

TECHNICAL FIELD

The present invention relates to a cutting insert. This application is a U.S. National Phase application under 35 U.S.C. § 371 of International Application No. PCT/JP2016/088912, filed on Dec. 27, 2016, which claims priority based on Japanese Patent Application No. 2016-202652 filed on Oct. 14, 2016. The International Application was published in Japanese on Apr. 19, 2018 as WO 2018/070058 A9 under PCT Article 21(2). The entire contents of all the above-noted applications which are incorporated herein by reference.

BACKGROUND ART

WO 2015/174200 (PTD 1) discloses a cutting insert for milling. The inclination angle of a rake surface continuous with a main cutting edge of the cutting insert is substantially constant in the extending direction of the main cutting edge.

CITATION LIST

Patent Document

PTD 1: WO 2015/174200

SUMMARY OF INVENTION

A cutting insert according to an aspect of the present invention includes a first surface, a second surface, and a side surface. The second surface is located opposite to the first surface. The side surface is continuous with both the first surface and the second surface. A ridge line between the first surface and the side surface includes a cutting edge. The first surface has a rake surface continuous with the cutting edge, and a reference surface located on a side opposite to the cutting edge with respect the rake surface and having a planar shape. The cutting edge has a corner cutting edge, a flat drag continuous with a first end portion of the corner cutting edge, and a main cutting edge continuous with a second end portion of the corner cutting edge, the second end portion being located opposite to the first end portion. The rake surface has a first rake surface portion continuous with the flat drag, a second rake surface portion continuous with the main cutting edge, and a third rake surface portion continuous with the corner cutting edge and located between the first rake surface portion and the second rake surface portion. The first rake surface portion has a first inclined surface inclined at a first angle with respect to the reference surface. The second rake surface portion has a second inclined surface inclined at a second angle greater than the first angle with respect to the reference surface. The first angle and the second angle are positive angles with respect to the reference surface. The first end portion and the second end portion are higher than the reference surface in a direction perpendicular to the reference surface, and the main cutting edge extends so as to intersect the reference surface when viewed in a direction parallel to the reference surface. A first step portion rising from the third rake surface portion and continuous with the first rake surface portion is provided on the rake surface.

DETAILED DESCRIPTION

Figure 1:
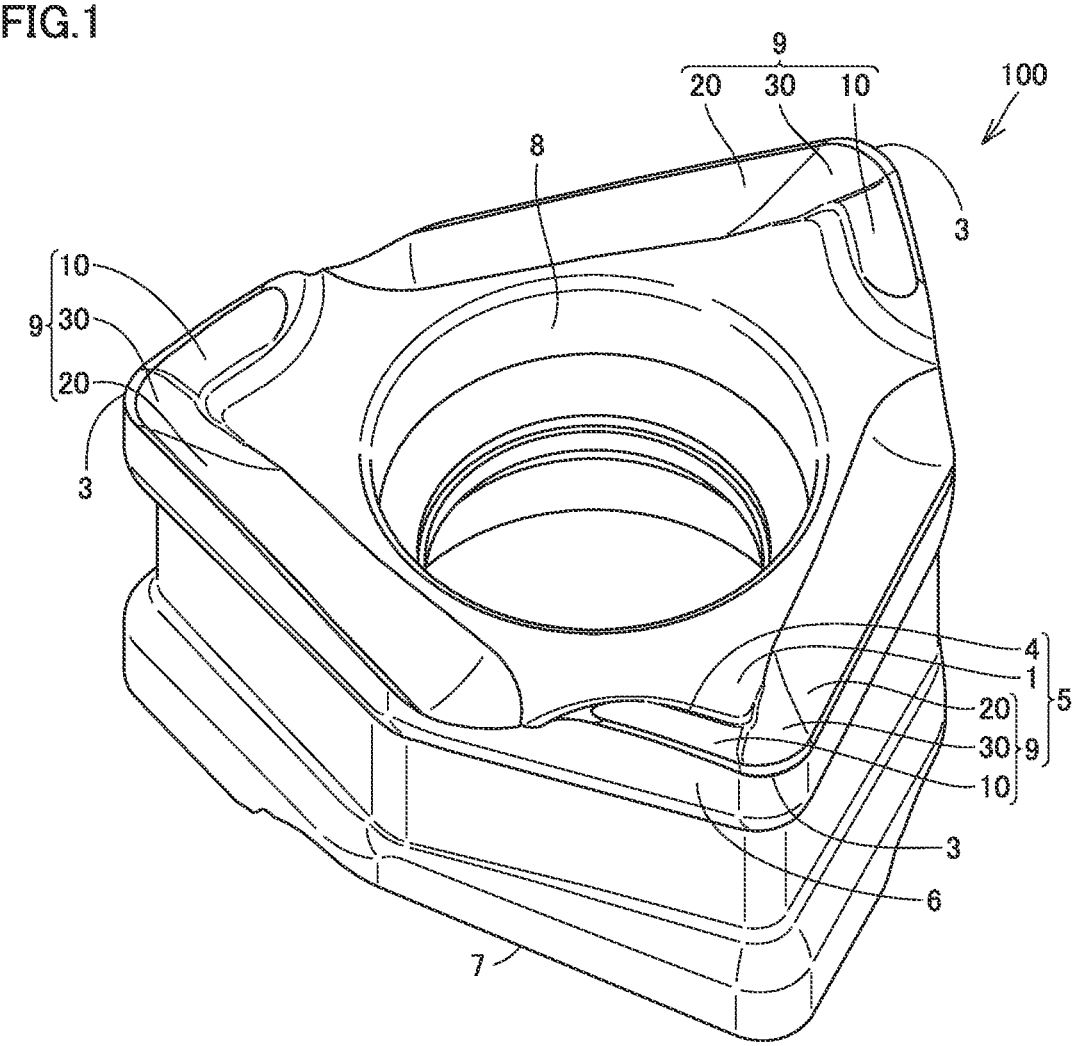
FIG. 1 is a schematic perspective view illustrating a configuration of a cutting insert according to a first embodiment.

Problem to be Solved by the Present Disclosure

When a workpiece is machined using the cutting insert disclosed in WO 2015/174200, a scratch mark may remain on a machined surface of the workpiece.

An object of an aspect of the present invention is to provide a cutting insert capable of reducing the likelihood that a scratch mark will remain on a machined surface of a workpiece.

Advantageous Effect of the Present Disclosure

According to an aspect of the present invention, it is possible to provide a cutting insert capable of reducing the likelihood that a scratch mark will remain on a machined surface of a workpiece.

DESCRIPTION OF EMBODIMENTS

First, an outline of embodiments of the present invention will be described.

(1) A cutting insert 100 according to an aspect of the present invention includes a first surface 5, a second surface 7, and a side surface 6. Second surface 7 is located opposite to first surface 5. Side surface 6 is continuous with both first surface 5 and second surface 7. A ridge line between first surface 5 and side surface 6 includes a cutting edge 3. First surface 5 has a rake surface 9 continuous with cutting edge 3 and a reference surface 1 located on a side opposite to the cutting edge with respect to rake surface 9 and having a planar shape. Cutting edge 3 has a corner cutting edge 33, a flat drag 13 continuous with a first end portion C1 of corner cutting edge 33, and a main cutting edge 23 continuous with a second end portion C2 of corner cutting edge 33, second end portion C2 located opposite to first end portion C1. Rake surface 9 has a first rake surface portion 10 continuous with flat drag 13, a second rake surface portion 20 continuous with main cutting edge 23, and a third rake surface portion 30 continuous with corner cutting edge 33 and located between first rake surface portion 10 and second rake surface portion 20. First rake surface portion 10 has a first inclined surface 11 inclined at a first angle $\theta 1$ with respect to reference surface 1. Second rake surface portion 20 has a second inclined surface 21 inclined at a second angle $\theta 2$ greater than first angle $\theta 1$ with respect to reference surface 1. First angle $\theta 1$ and second angle $\theta 2$ are positive angles with respect to reference surface 1. First end portion C1 and second end portion C2 are higher than reference surface 1 in a direction perpendicular to reference surface 1, and main cutting edge 23 extends so as to intersect reference surface 1 when viewed in a direction parallel to reference surface 1. A first step portion 2 rising from third rake surface portion 30 and continuous with first rake surface portion 10 is provided on rake surface 9.

Figure 10:
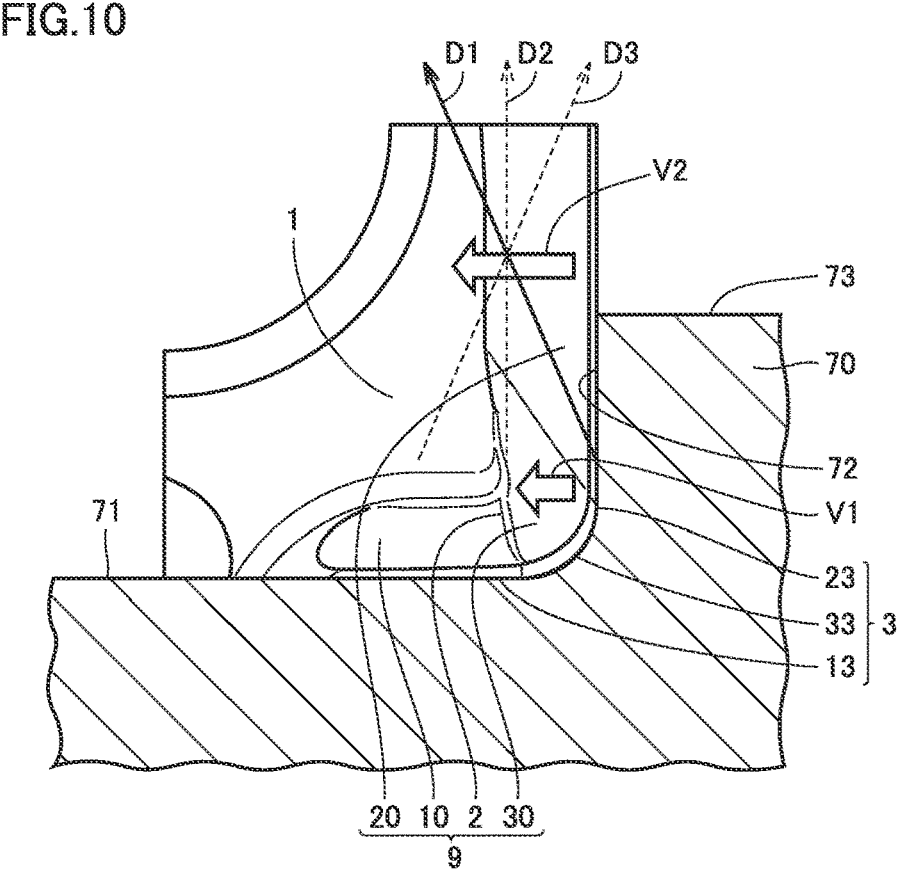
FIG. 10 is a schematic front view illustrating a state where a workpiece is being cut using a cutting tool.
Figure 11:
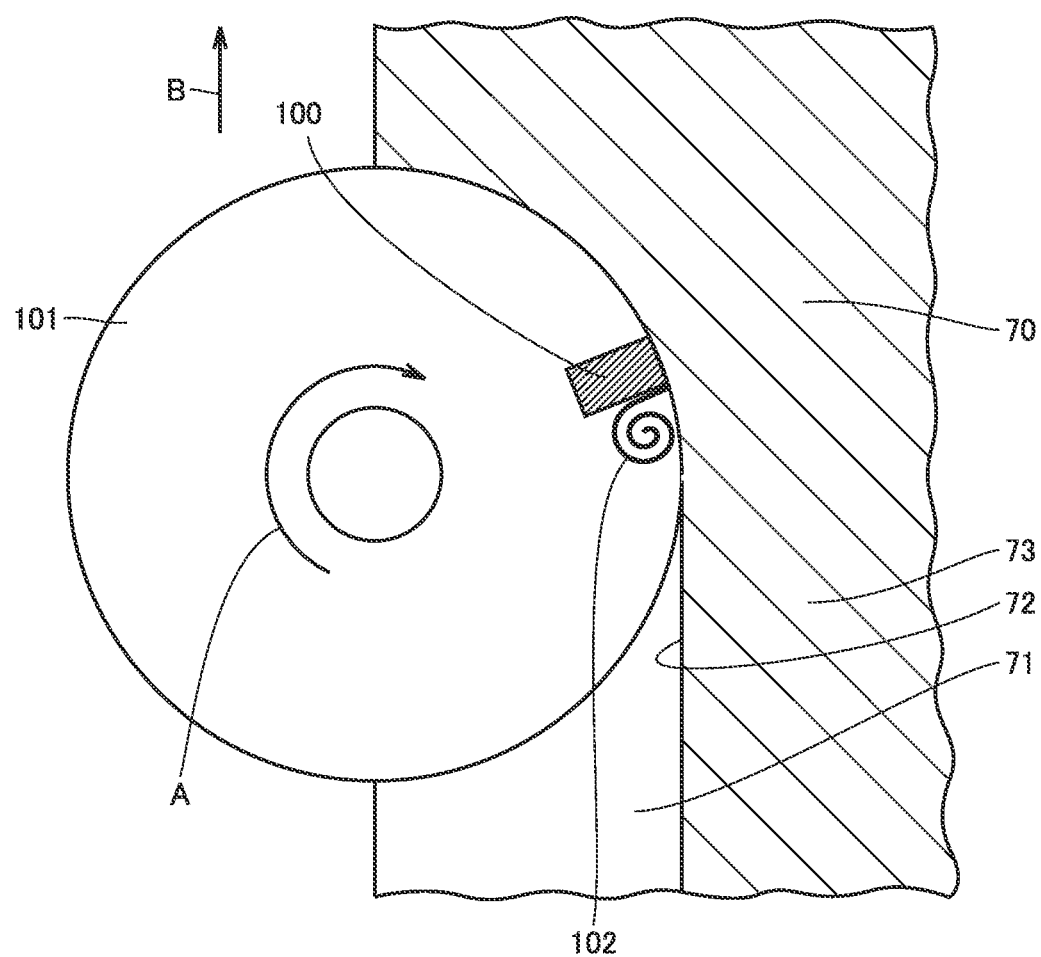
FIG. 11 is a schematic plan view illustrating a state where the workpiece is being cut using the cutting tool.

With reference to FIGS. 10 and 11, a description will be given of a state where corner cutting is performed on a workpiece 70 using cutting insert 100. Cutting edge 3 of cutting insert 100 has flat drag 13, main cutting edge 23, and corner cutting edge 33. Cutting insert 100 is attached to a milling cutter body 101. As illustrated in FIG. 11, when milling cutter body 101 rotates, cutting insert 100 rotates in a rotation direction A. Milling cutter body 101 moves in a movement direction B while rotating in rotation direction A. Rotating cutting edge 3 cuts workpiece 70, and a chip 102 is generated. Preferably, chip 102 curls spirally.

In a cutting insert disclosed in WO 2015/174200, the inclination angle of a rake surface continuous with a main cutting edge of the cutting insert is substantially constant in the extending direction of the main cutting edge. Therefore, in a case where workpiece 70 is machined using the cutting insert, discharge speed V2 of part of the chip in the vicinity of the center of main cutting edge 23 is almost equal to discharge speed V1 of part of the chip in the vicinity of corner cutting edge 33 or lower than discharge speed V1. In this case, the discharge direction of entirety of chip 102 is a direction D2 substantially parallel to a side surface 72 of workpiece 70 or a direction D3 including a vector component in the outer circumferential direction of the milling cutter body. In these cases, when a curl diameter of chip 102 increases, chip 102 comes into contact with (machined) side surface 72 of workpiece 70 after machining, and gives a scratch mark on side surface 72. Side surface 72 looks cloudy, for example. In addition, there is a case where chip 102 comes into contact with an (unmachined) upper surface 73 of workpiece 70 before machining beyond side surface 72 and gives a scratch mark on upper surface 73. In this case, upper surface 73 looks cloudy, for example.

Further there is a case where, when chip 102 comes into contact with side surface 72 and the discharge direction of chip 102 changes, chip 102 comes into contact with a bottom surface 71 of workpiece 70, that is, a surface to be machined with the flat drag. In this case, a scratch mark is also formed on bottom surface 71 of workpiece 70. Furthermore, there is a case where chip 102 comes into contact with the side surface of cutting insert 100, and a scratch mark is formed on the side surface.

First step portion 2 rising from third rake surface portion 30 and continuous with first rake surface portion 10 is provided on rake surface 9 of cutting insert 100 according to an aspect of the present invention. First step portion 2 works so as to reduce the discharge speed of chip 102 in the vicinity of corner cutting edge 33. Therefore, discharge speed V1 of part of the chip in the vicinity of corner cutting edge 33 is lower than discharge speed V2 of part of the chip in the vicinity of the center of main cutting edge 23. As a result, the discharge direction of chip 102 is a direction D1 including a vector component in the inner circumferential direction of the milling cutter body. Therefore, it is possible to reduce the likelihood that chip 102 will come into contact with (machined) side surface 72 of workpiece 70 after machining. As a result, it is possible to reduce the likelihood that a scratch mark will remain on the machined surface of the workpiece.

(2) In cutting insert 100 according to (1), a height of first step portion 2 in the direction perpendicular to reference surface 1 may be greater than or equal to 0.04 mm and less than or equal to 0.10 mm in a cross section passing through second end portion C2 and parallel to flat drag 13. Thus, it is possible to appropriately control the discharge direction of the chip and to further reduce the likelihood that a scratch mark will remain on the machined surface of the workpiece.

(3) In cutting insert 100 according to (2), a distance between first step portion 2 and second end portion C2 in the direction parallel to reference surface 1 in the cross section is greater than or equal to 0.4 mm and less than or equal to 1.0 mm. Thus, it is possible to appropriately control the discharge direction of the chip and to further reduce the likelihood that a scratch mark will remain on the machined surface of the workpiece.

(4) In cutting insert 100 according to any one of (1) to (3), entirety of first rake surface portion 10 may constitute first step portion 2.

(5) In cutting insert 100 according to any one of (1) to (4), a central portion of flat drag 13 may be higher than first end portion C1 in the direction perpendicular to reference surface 1.

(6) In cutting insert 100 according to any one of (1) to (5), first angle $\theta 1$ may be greater than or equal to 3° and less than or equal to 30°.

(7) In cutting insert 100 according to any one of (1) to (6), second angle $\theta 2$ may be greater than or equal to 3° and less than or equal to 30°.

(8) In cutting insert 100 according to any one of (1) to (7), side surface 6 may include a first side portion 61 continuous with flat drag 13. Flat drag 13 may have a first flat drag portion 13a closer to the corner cutting edge and a second flat drag portion 13b continuous with first flat drag portion 13a. An inclination angle $\theta 3$ of first flat drag portion 13a with respect to a straight line 1a parallel to reference surface 1 may be greater than an inclination angle $\theta 4$ of second flat drag portion 13b with respect to a straight line 1b parallel to reference surface 1 when viewed in a direction perpendicular to first side portion 61.

(9) In cutting insert 100 according to any one of (1) to (8), second rake surface portion 20 may have a first area 20a continuous with third rake surface portion 30, and a second area 20b located on a side opposite to third rake surface portion 30 with respect to first area 20a. A second step portion 16 rising from first area 20a and continuous with second area 20b may be provided on second rake surface portion 20. Thus, it is possible to further reduce the likelihood that a scratch mark will remain on the machined surface of the workpiece.

In cutting insert 100 according to (9), second step portion 16 rising from first area 20a and continuous with second area 20b is provided on second rake surface portion 20. Since corner cutting edge 33 is curved, a chip cut by corner cutting edge 33 moves obliquely upward to the left in FIG. 10. Since second step portion 16 is provided to extend in a direction intersecting a movement direction of the chip, second step portion 16 works so as to reduce the discharge speed of the chip cut by corner cutting edge 33. Therefore, discharge speed V1 of part of the chip in the vicinity of corner cutting edge 33 is further lower than discharge speed V2 of part of the chip in the vicinity of the center of main cutting edge 23. As a result, the discharge direction of chip 102 is a direction D1 including a vector component in the inner circumferential direction of the milling cutter body. Therefore, it is possible to reduce the likelihood that chip 102 will come into contact with (machined) side surface 72 of workpiece 70 after machining. As a result, it is possible to reduce the likelihood that a scratch mark will remain on the machined surface of the workpiece.

(10) In cutting insert 100 according to (9), a height F of second step portion 16 in the direction perpendicular to reference surface 1 may be greater than or equal to 0.04 mm and less than or equal to 0.5 mm in a cross section passing through a middle point MP between first end portion C1 and second end portion C2 in a direction parallel to flat drag 13, the cross section being parallel to main cutting edge 23. Thus, it is possible to further reduce the likelihood that a scratch mark will remain on the machined surface of the workpiece.

(11) In cutting insert 100 according to (9) or (10), an inclination angle θ7 of a rising surface 20c of second step portion 16 with respect to reference surface 1 may be greater than or equal to 10° and less than or equal to 60°. Thus, it is possible to further reduce the likelihood that a scratch mark will remain on the machined surface of the workpiece.

(12) In cutting insert 100 according to any one of (9) to (11), inclination angle θ7 of rising surface 20c of second step portion 16 with respect to reference surface 1 may be smaller than an inclination angle θ8 of a rising surface 40 of first step portion 2 with respect to the reference surface.

(13) In cutting insert 100 according to any one of (1) to (12), side surface 6 may include a second side portion 62 continuous with main cutting edge 23. Main cutting edge 23 may have a first main cutting edge portion 23a closer to the corner cutting edge and a second main cutting edge portion 23b continuous with first main cutting edge portion 23a. An inclination angle θ5 of first main cutting edge portion 23a with respect to a straight line 1c parallel to reference surface 1 may be greater than an inclination angle θ6 of second main cutting edge portion 23b with respect to a straight line 1d parallel to reference surface 1 when viewed in a direction perpendicular to second side portion 62. Thus, it is possible to further reduce the likelihood that a scratch mark will remain on the machined surface of the workpiece.

DETAILS OF EMBODIMENTS OF PRESENT INVENTION

Next, embodiments of the present invention will be described in detail with reference to the drawings. Note that in the following drawings, identical or corresponding parts are denoted by identical reference numerals, and description thereof will not be repeated.

First Embodiment

First, a configuration of a cutting insert 100 according to a first embodiment will be described.

Figure 2:
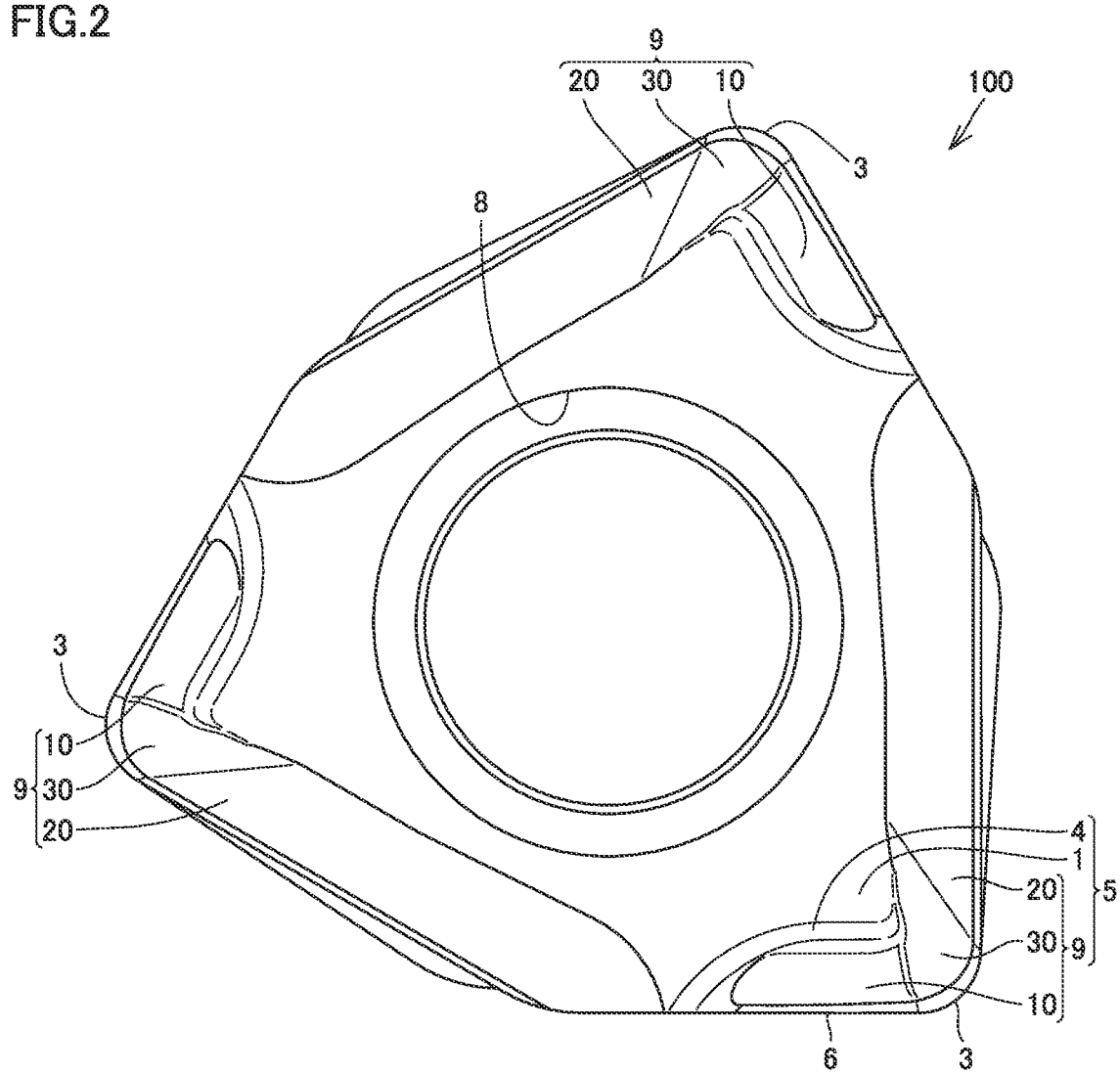
FIG. 2 is a schematic front view illustrating a configuration of the cutting insert according to the first embodiment.

As illustrated in FIGS. 1 and 2, cutting insert 100 according to the present embodiment mainly has a first surface 5, a second surface 7, and a side surface 6. Each of first surface 5 and second surface 7 has a substantially polygonal (substantially hexagonal) shape having, for example, an acute corner (or a right angle corner) and an obtuse corner alternately. Second surface 7 is located opposite to first surface 5. Side surface 6 is continuous with both first surface 5 and second surface 7. Cutting insert 100 is provided with a through hole 8 opening on first surface 5 and second surface 7.

A ridge line between first surface 5 and side surface 6 includes a cutting edge 3. Cutting edge 3 is provided, for example, at each of three corners on substantially hexagonal first surface 5. Similarly, a ridge line between second surface 7 and side surface 6 includes cutting edge 3. Cutting edge 3 is provided, for example, at each of three corners on substantially hexagonal second surface 7. First surface 5 mainly has a rake surface 9 and a reference surface 1. Rake surface 9 is continuous with cutting edge 3. Reference surface 1 is located on a side opposite to cutting edge 3 with respect to rake surface 9. Reference surface 1 has a planar shape. Reference surface 1 is, for example, a seating surface. Reference surface 1 is located between through hole 8 and rake surface 9. For example, the seating surface of cutting insert 100 is brought into contact with a milling cutter body 101, and thus cutting insert 100 is positioned.

Figure 3:
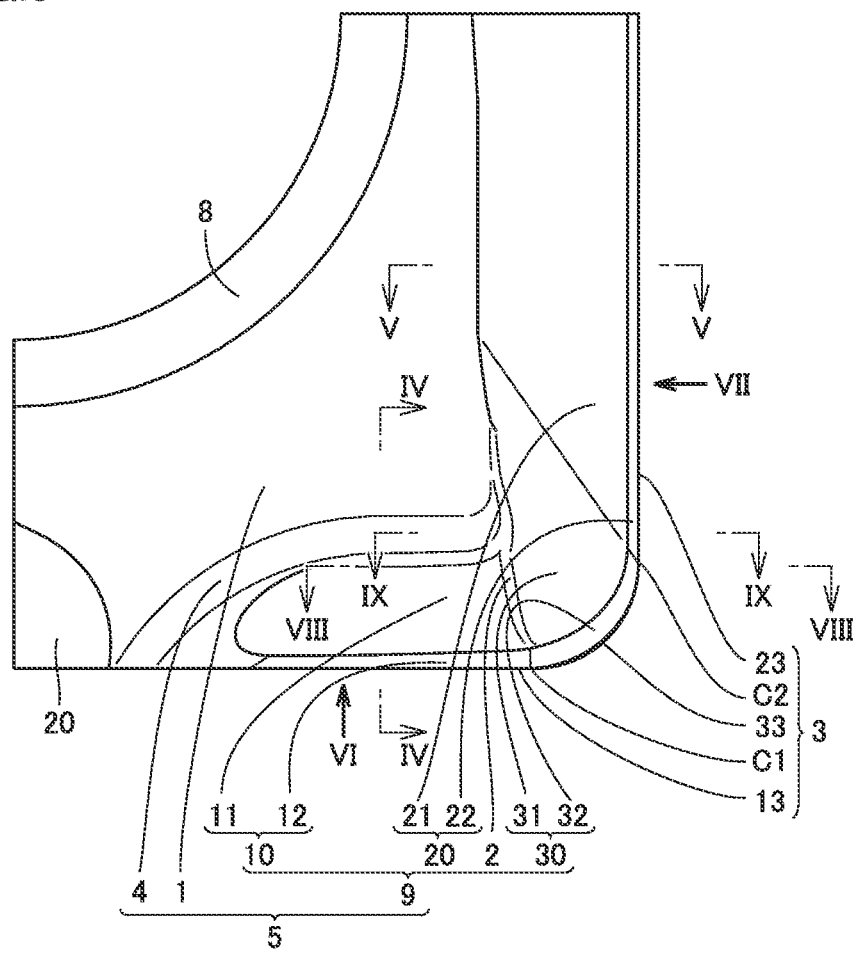
FIG. 3 is a schematic front view illustrating a configuration in the vicinity of a rake surface of the cutting insert according to the first embodiment.

As illustrated in FIG. 3, cutting edge 3 mainly has a corner cutting edge 33, a flat drag 13, and a main cutting edge 23. Corner cutting edge 33 is located at a nose rounded portion of first surface 5. Corner cutting edge 33 has a first end portion C1 and a second end portion C2. Second end portion C2 is an end portion located opposite to first end portion C1. Flat drag 13 is continuous with first end portion C1 of corner cutting edge 33. Main cutting edge 23 is continuous with second end portion C2 of corner cutting edge 33.

Rake surface 9 has a first rake surface portion 10, a second rake surface portion 20, and a third rake surface portion 30. First rake surface portion 10 is continuous with flat drag 13. Second rake surface portion 20 is continuous with main cutting edge 23. Third rake surface portion 30 is continuous with corner cutting edge 33. Third rake surface portion 30 is located between first rake surface portion 10 and second rake surface portion 20.

As illustrated in FIG. 3, first rake surface portion 10 may have a first inclined surface 11 and a first land surface 12. First land surface 12 is continuous with flat drag 13. First inclined surface 11 is continuous with first land surface 12. First inclined surface 11 is located on a side opposite to flat drag 13 with respect to first land surface 12. Second rake surface portion 20 may have a second inclined surface 21 and a second land surface 22. Second land surface 22 is continuous with main cutting edge 23. Second inclined surface 21 is continuous with second land surface 22. Second inclined surface 21 is located on a side opposite to main cutting edge 23 with respect to second land surface 22. Third rake surface portion 30 may have a third inclined surface 31 and a third land surface 32. Third land surface 32 is continuous with corner cutting edge 33. Third inclined surface 31 is continuous with third land surface 32. Third inclined surface 31 is located on a side opposite to corner cutting edge 33 with respect to third land surface 32.

Figure 4:
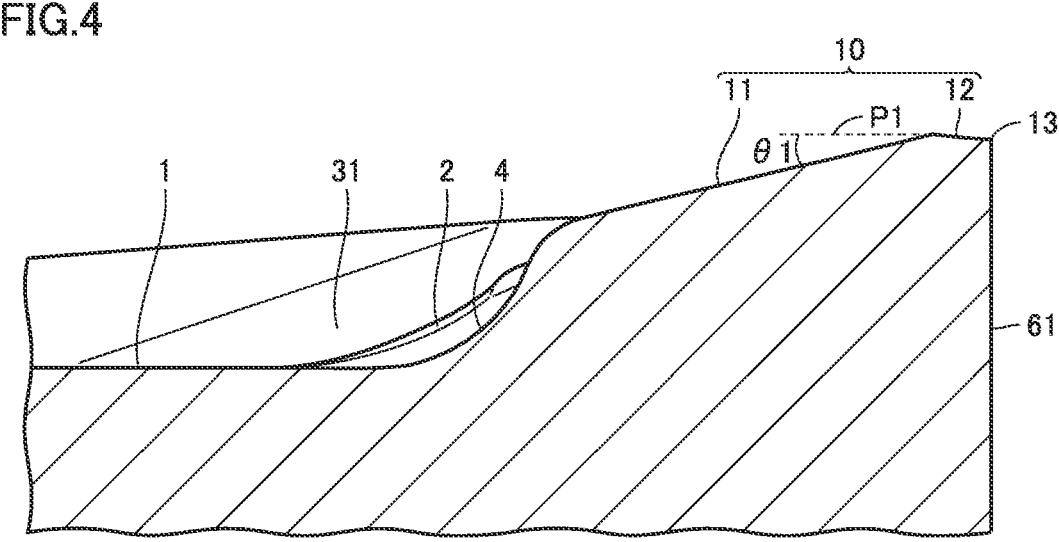
FIG. 4 is a schematic cross-sectional view taken along line IV-IV in FIG. 3, as viewed in the direction of arrows.

As illustrated in FIG. 4, first inclined surface 11 is inclined at a first angle θ1 with respect to a plane P1 parallel to reference surface 1. First angle θ1 is, for example, greater than or equal to 3° and less than or equal to 30°. A fourth inclined surface 4 is continuous with first inclined surface 11. Reference surface 1 is continuous with fourth inclined surface 4. Fourth inclined surface 4 is located between first inclined surface 11 and reference surface 1. An inclination angle of fourth inclined surface 4 with respect to reference surface 1 may be greater than an inclination angle of first inclined surface 11 with respect to reference surface 1.

Figure 5:
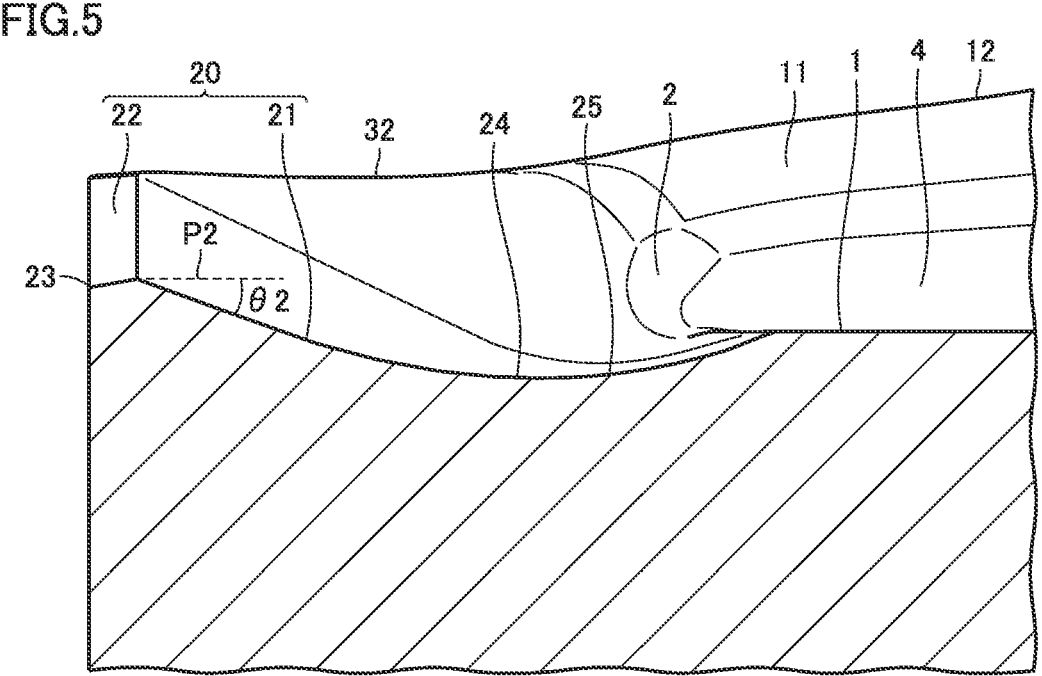
FIG. 5 is a schematic cross-sectional view taken along line V-V in FIG. 3, as viewed in the direction of arrows.

As illustrated in FIG. 5, second inclined surface 21 is inclined at a second angle θ2 with respect to plane P2 parallel to reference surface 1. Second angle θ2 is greater than first angle θ1. Second angle θ2 is, for example, greater than or equal to 3° and less than or equal to 30°. A fifth inclined surface 25 is continuous with second inclined surface 21. Reference surface 1 is continuous with fifth inclined surface 25. Fifth inclined surface 25 is located between second inclined surface 21 and reference surface 1. Fifth inclined surface 25 is higher as approaching reference surface 1. A boundary portion 24 between second inclined surface 21 and fifth inclined surface 25 is lower than reference surface 1 in a direction perpendicular to reference surface 1. In other words, a plane along reference surface 1 intersects second inclined surface 21.

First angle θ1 is a positive angle with respect to reference surface 1. Here, first angle θ1 being a positive angle with respect to reference surface 1 means that first inclined surface 11 is inclined with respect to reference surface 1 such that first inclined surface 11 becomes lower as the distance from flat drag 13 increases. From another point of view, first angle θ1 being a positive angle with respect to reference surface 1 means a case where first inclined surface 11 extends to the lower left in a case where cutting insert 100 is disposed such that flat drag 13 faces to the right and reference surface 1 faces upward (see FIG. 4). As illustrated in FIG. 4, first land surface 12 is inclined with respect to reference surface 1 so as to be higher as the distance from flat drag 13 increases. An inclination angle of first land surface 12 with respect to reference surface 1 is a negative angle.

Similarly, second angle θ2 is a positive angle with respect to reference surface 1. Here, second angle θ2 being a positive angle with respect to reference surface 1 means that second inclined surface 21 is inclined with respect to reference surface 1 such that second inclined surface 21 becomes lower as the distance from main cutting edge 23 increases. From another point of view, second angle θ2 being a positive angle with respect to reference surface 1 means a case where second inclined surface 21 extends to the lower right in a case where cutting insert 100 is disposed such that main cutting edge 23 faces to the left and reference surface 1 faces upward (see FIG. 5). As illustrated in FIG. 5, second land surface 22 is inclined with respect to reference surface 1 so as to be higher as the distance from main cutting edge 23 increases. An inclination angle of second land surface 22 with respect to reference surface 1 is a negative angle.

Figure 6:
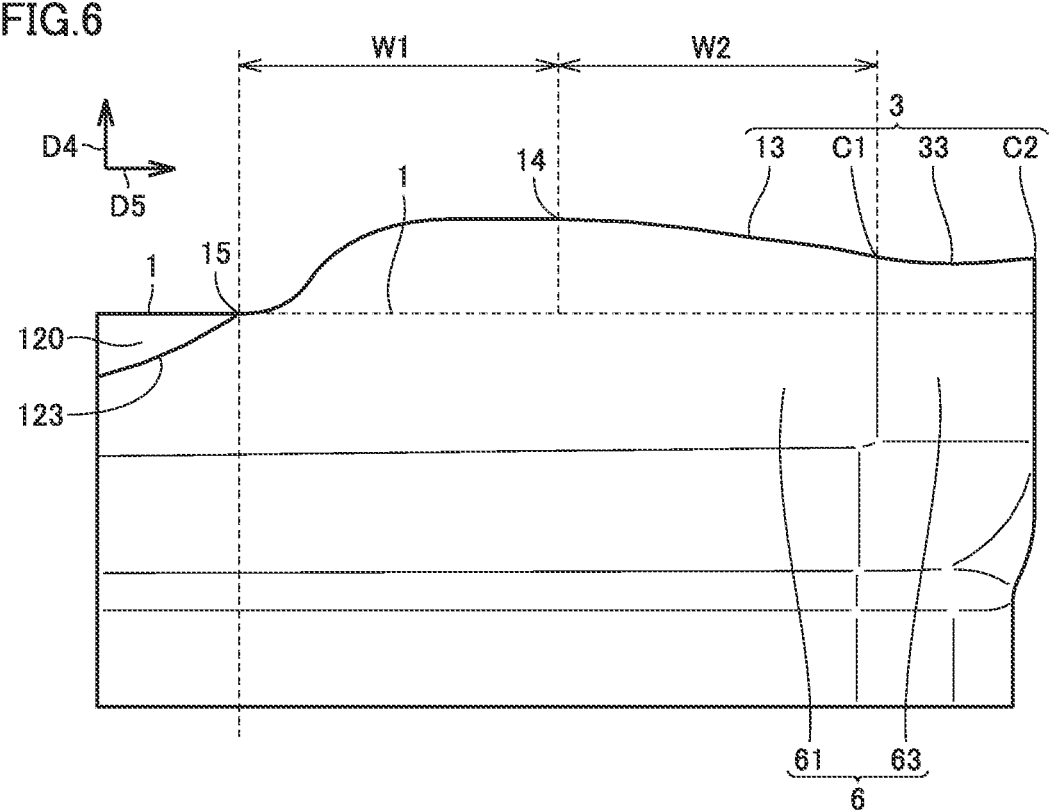
FIG. 6 is a schematic side view illustrating a configuration of the cutting insert as viewed in a direction of arrow VI in FIG. 3.
Figure 7:
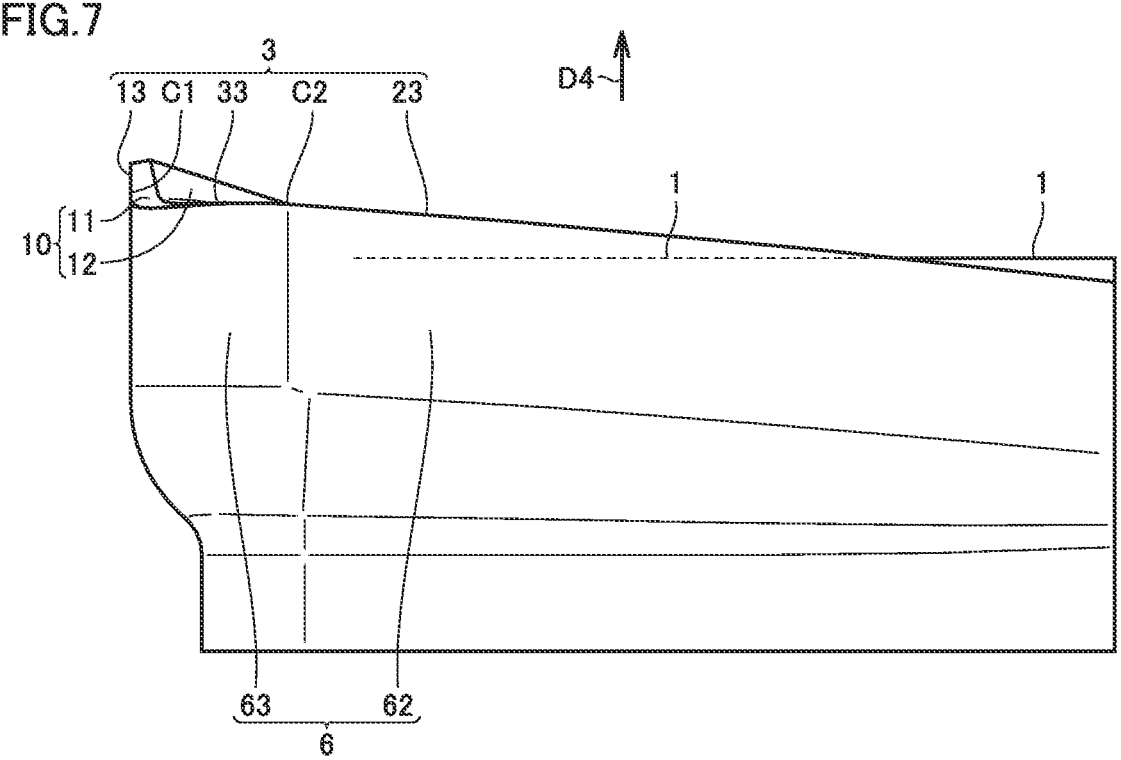
FIG. 7 is a schematic side view illustrating a configuration of the cutting insert as viewed in a direction of arrow VII in FIG. 3.

As illustrated in FIGS. 6 and 7, side surface 6 has a first side portion 61, a second side portion 62, and a third side portion 63. A ridge line between first side portion 61 and first rake surface portion 10 constitutes flat drag 13. A ridge line between second side portion 62 and second rake surface portion 20 constitutes main cutting edge 23. A ridge line between third side portion 63 and third rake surface portion 30 constitutes corner cutting edge 33.

As illustrated in FIG. 6, in a direction D4 perpendicular to reference surface 1, first end portion C1 and second end portion C2 of corner cutting edge 33 are higher than reference surface 1. First end portion C1 and second end portion C2 being higher than reference surface 1 means that first end portion C1 and second end portion C2 are located higher than reference surface 1 in a case where cutting insert 100 is disposed such that reference surface 1 faces upward. Flat drag 13 becomes higher as the distance from first end portion C1 increases, and then becomes lower after flat drag 13 reaches a peak. The midpoint of the distance between a connecting portion 15 between flat drag 13 and another main cutting edge 123 and first end portion C1 in a direction parallel to reference surface 1 is a central portion 14 of flat drag 13. In a direction D5 parallel to reference surface 1, a distance W1 from central portion 14 to connecting portion 15 is equal to a distance W2 from central portion 14 to first end portion C1. In direction D4 perpendicular to reference surface 1, central portion 14 of flat drag 13 may be higher than first end portion C1.

As illustrated in FIG. 7, main cutting edge 23 becomes lower as the distance from second end portion C2 increases. When viewed in a direction parallel to reference surface 1, main cutting edge 23 extends so as to intersect reference surface 1. In other words, in direction D4 perpendicular to reference surface 1, main cutting edge 23 approaches reference surface 1, intersects reference surface 1, and then separates from reference surface 1 as the distance from second end portion C2 increases.

Figure 8:
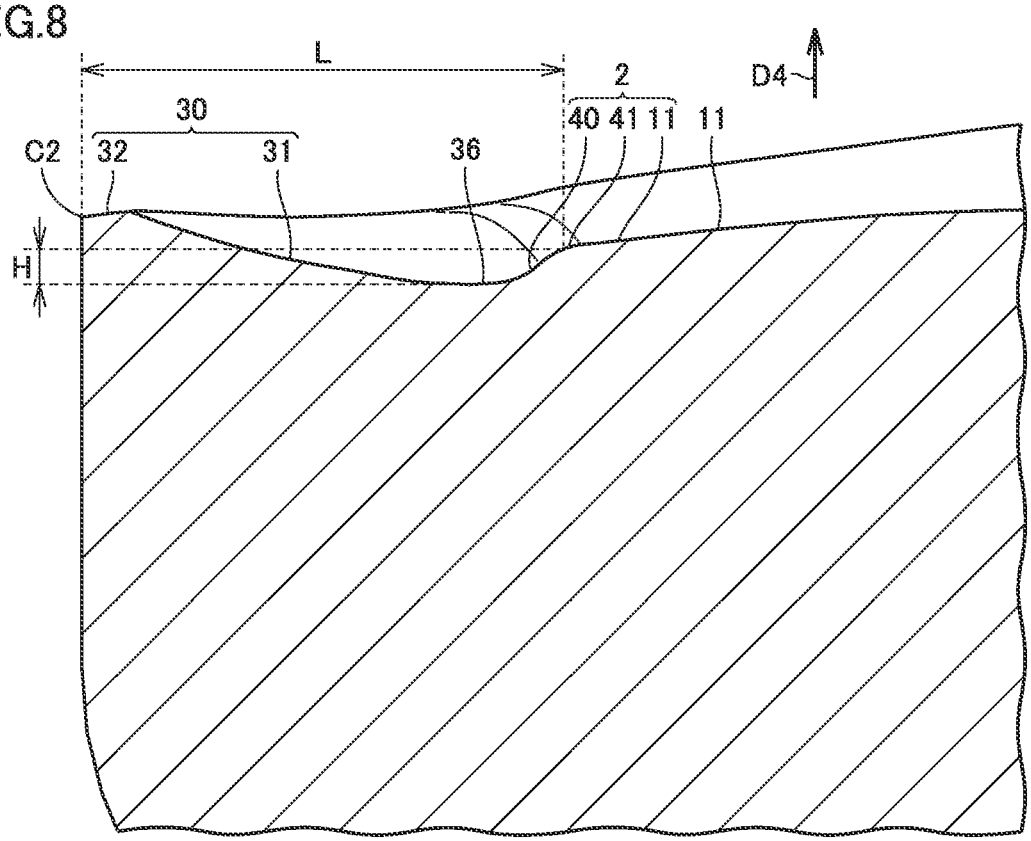
FIG. 8 is a schematic cross-sectional view taken along line VIII-VIII in FIG. 3, as viewed in the direction of arrows.

FIG. 8 is a cross section passing through second end portion C2 and parallel to flat drag 13. As illustrated in FIGS. 3 and 8, a first step portion 2 rising from a third inclined surface 31 of third rake surface portion 30 and continuous with first rake surface portion 10 is provided on rake surface 9. First step portion 2 may be defined by a rising surface 40 and first inclined surface 11 continuous with rising surface 40. A boundary portion 36 between third inclined surface 31 and rising surface 40 is lower than first inclined surface 11 in direction D4 perpendicular to reference surface 1. In the cross section of FIG. 8, first inclined surface 11 becomes monotonically higher as the distance from second end portion C2 increases. As illustrated in FIG. 8, entirety of first rake surface portion 10 may constitute first step portion 2. In the cross section of FIG. 8, as the distance from second end portion C2 increases, the height of first inclined surface 11 may be substantially constant or part of first inclined surface 11 may be lower than the other part of first inclined surface 11.

In the cross section of FIG. 8 (that is, a cross section passing through second end portion C2 and parallel to flat drag 13), a height H of first step portion 2 in direction D4 perpendicular to reference surface 1 may be, for example, greater than or equal to 0.04 mm and less than or equal to 0.50 mm. Note that height H of first step portion 2 is a distance between boundary portion 36 between third inclined surface 31 and rising surface 40 and a boundary portion 41 between rising surface 40 and first inclined surface 11. In a cross-sectional view, an inclination angle of third inclined surface 31 with respect to reference surface 1 is a positive angle. In contrast, an inclination angle of rising surface 40 with respect to reference surface 1 is a negative angle. An inclination angle is zero at boundary portion 36 between third inclined surface 31 and rising surface 40. Similarly, an inclination angle of first inclined surface 11 with respect to reference surface 1 is a negative angle. The inclination angle of first inclined surface 11 with respect to reference surface 1 is smaller than inclination angle of rising surface 40 with respect to reference surface 1. The inclination angle changes at boundary portion 41 between rising surface 40 and first inclined surface 11.

In the cross section of FIG. 8, a distance L between first step portion 2 and second end portion C2 in the direction parallel to reference surface 1 is, for example, greater than or equal to 0.4 mm and less than or equal to 3.0 mm. Note that more specifically, the distance between first step portion 2 and second end portion C2 is a distance between boundary portion 41 between rising surface 40 and first inclined surface 11 and second end portion C2.

As illustrated in FIG. 3, first step portion 2 may extend toward first end portion C1 along a boundary line between third rake surface portion 30 and reference surface 1 when viewed in the direction perpendicular to reference surface 1. An extending direction of first step portion 2 may be substantially parallel to main cutting edge 23. First step portion 2 may be continuous with reference surface 1. First step portion 2 may be continuous with fourth inclined surface 4.

Figure 9:
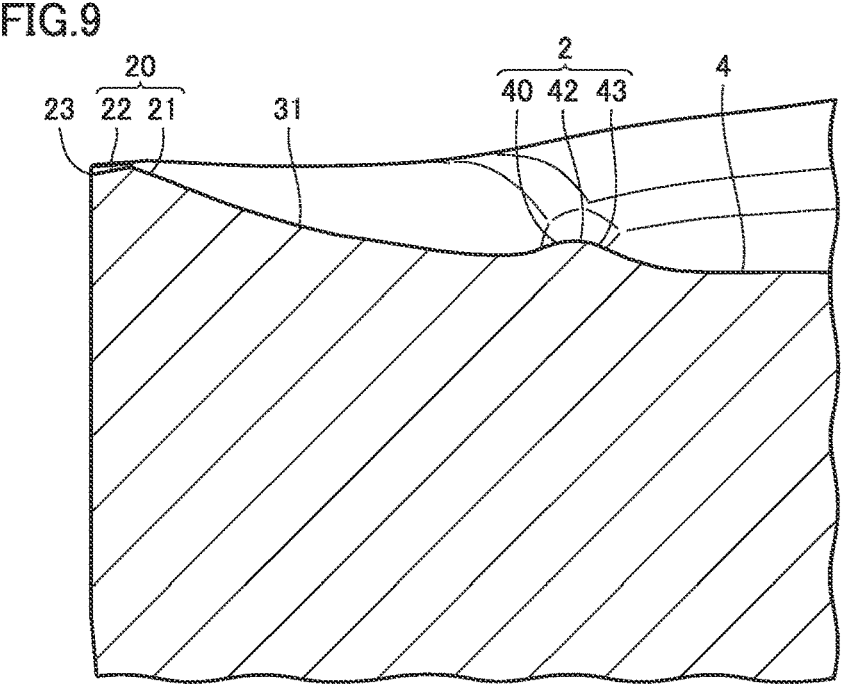
FIG. 9 is a schematic cross-sectional view taken along line IX-IX in FIG. 3, as viewed in the direction of arrows.

As illustrated in FIG. 9, in a cross section crossing main cutting edge 23, second rake surface portion 20, and third inclined surface 31, first step portion 2 may be defined by rising surface 40, a top surface 42, and a sixth inclined surface 43. Rising surface 40 rises from third inclined surface 31 toward top surface 42. Sixth inclined surface 43 rises from fourth inclined surface 4 toward top surface 42. The first step portion 2 may be a protruding portion rising from third inclined surface 31 and rising from fourth inclined surface 4. In the cross section of FIG. 9, an inclination angle of sixth inclined surface 43 with respect to reference surface 1 is a positive angle. An inclination angle of rising surface 40 with respect to reference surface 1 is a negative angle.

Second Embodiment

Next, a configuration of a cutting insert 100 according to a second embodiment will be described. The cutting insert according to the second embodiment differs from the cutting insert according to the first embodiment mainly in that the cutting insert according to the second embodiment has a second step portion. Regarding the other configuration, the cutting insert according to the second embodiment is almost identical to the cutting insert according to the first embodiment. Hereinafter, a configuration of the cutting insert according to the second embodiment will be described focusing on the configuration different from that of the first embodiment.

Figure 12:
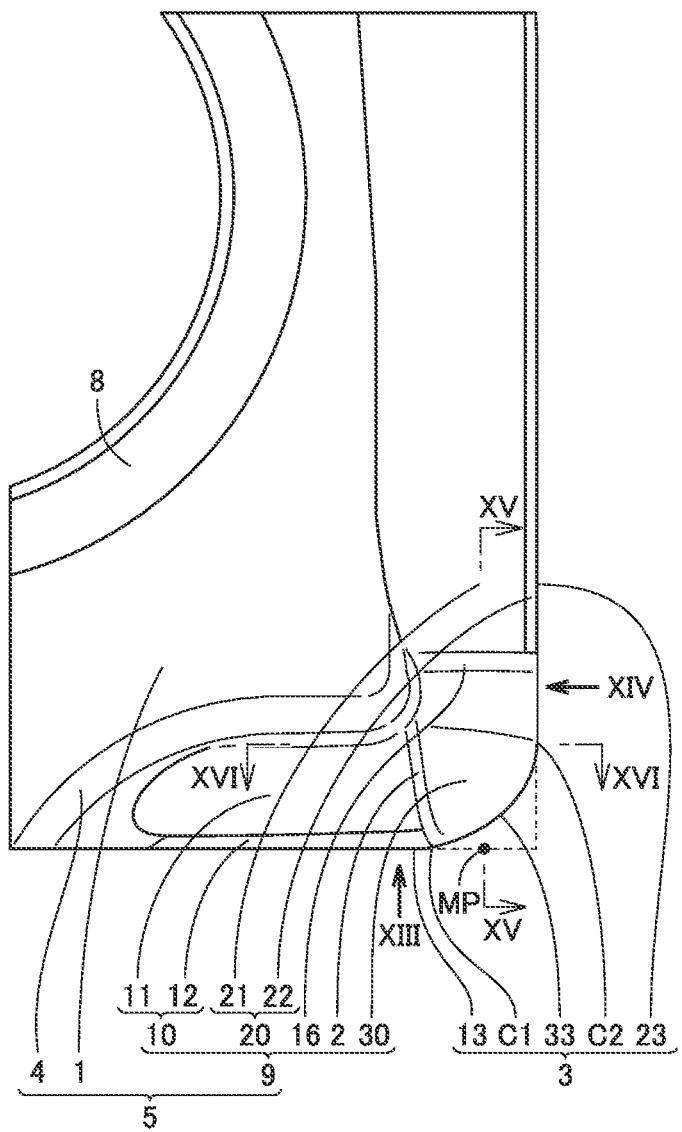
FIG. 12 is a schematic front view illustrating a configuration in the vicinity of a rake surface of a cutting insert according to a second embodiment.

As illustrated in FIG. 12, a second step portion 16 is provided on a second rake surface portion 20. In plan view, second step portion 16 extends in a direction intersecting an extending direction of a main cutting edge 23. Specifically, second step portion 16 extends in a direction substantially perpendicular to the extending direction of main cutting edge 23. Second step portion 16 may be continuous with main cutting edge 23 or may be separated from main cutting edge 23. In contrast, in plan view, a first step portion 2 extends in a direction intersecting an extending direction of a flat drag 13. Specifically, first step portion 2 extends in a direction substantially perpendicular to the extending direction of flat drag 13. The second step portion 16 may be continuous with first step portion 2 or may be separated from first step portion 2.

Figure 13:
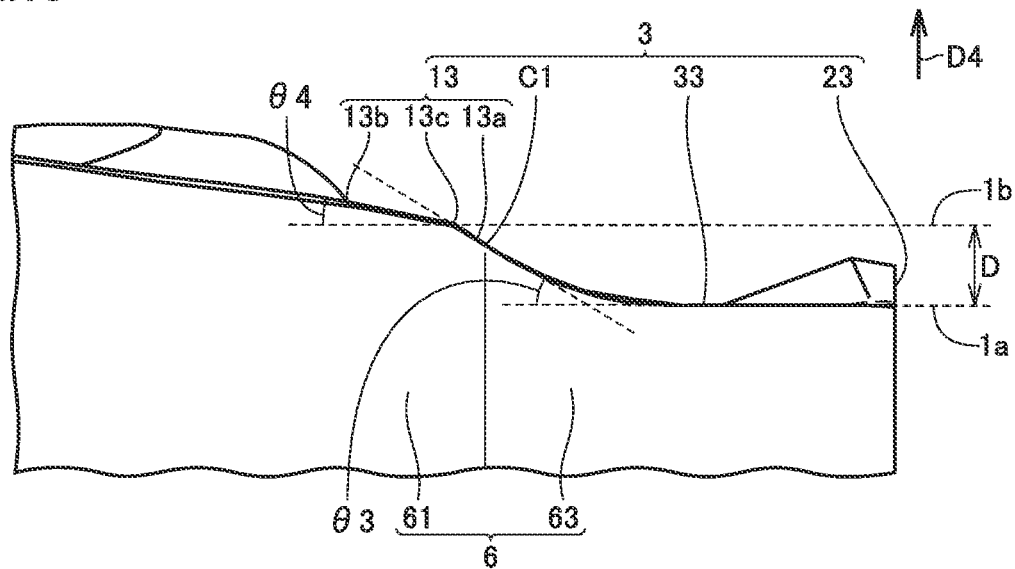
FIG. 13 is a schematic side view illustrating a configuration of the cutting insert as viewed in a direction of arrow XIII in FIG. 12.

As illustrated in FIG. 13, a side surface 6 includes a first side portion 61 continuous with flat drag 13 and a third side portion 63 continuous with a corner cutting edge 33. Flat drag 13 has a first flat drag portion 13a and a second flat drag portion 13b. First flat drag portion 13a is closer to corner cutting edge 33. Second flat drag portion 13b is continuous with first flat drag portion 13a. Second flat drag portion 13b is located on a side opposite to corner cutting edge 33 with respect to first flat drag portion 13a. First flat drag portion 13a is positioned between second flat drag portion 13b and corner cutting edge 33.

As illustrated in FIG. 13, an inclination angle θ3 of first flat drag portion 13a with respect to a straight line 1a parallel to reference surface 1 is greater than an inclination angle θ4 of second flat drag portion 13b with respect to a straight line 1b parallel to reference surface 1 when viewed in a direction perpendicular to first side portion 61. In other words, when viewed in a direction perpendicular to first side portion 61, flat drag 13 has an inflection point where inclination of flat drag 13 changes. A boundary portion 13c between first flat drag portion 13a and second flat drag portion 13b becomes the inflection point. An inclination angle θ3 of first flat drag portion 13a with respect to a straight line 1a parallel to reference surface 1 may be, for example, greater than or equal to 10° and less than or equal to 60°, or may be greater than or equal to 15° and less than or equal to 55°. The value obtained by subtracting inclination angle θ4 from inclination angle θ3 may be, for example, greater than or equal to 5°, or may be greater than or equal to 10°. A distance D between a boundary portion 13c between first flat drag portion 13a and second flat drag portion 13b and a lowermost position of corner cutting edge 33 in a direction perpendicular to reference surface 1 is, for example, greater than or equal to 0.04 mm and less than or equal to 0.5 mm.

Figure 14:
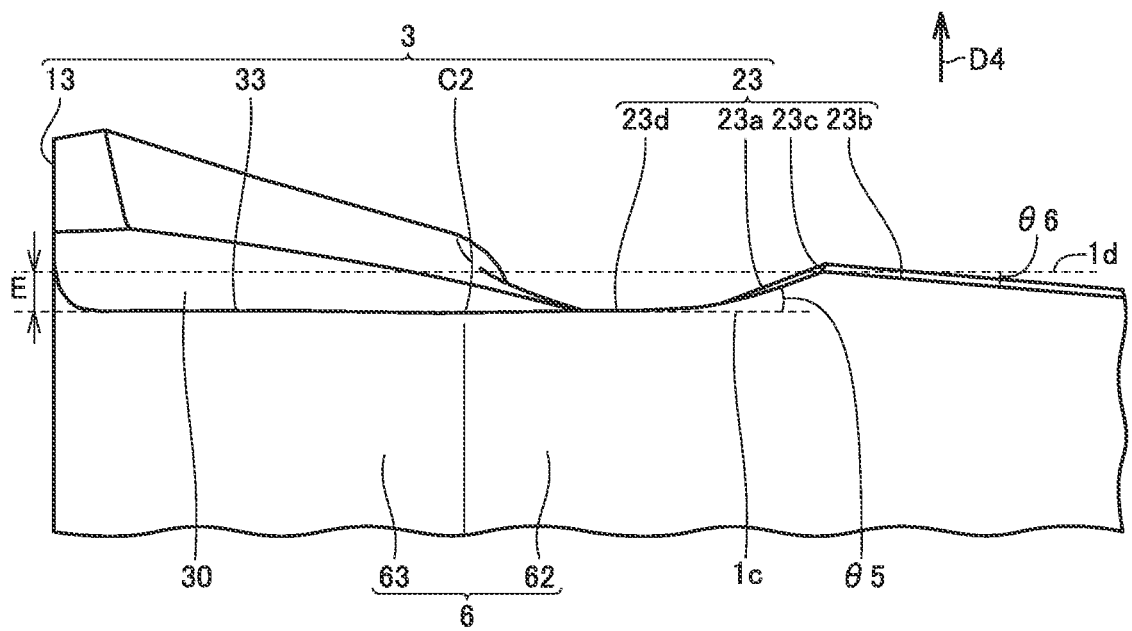
FIG. 14 is a schematic side view illustrating a configuration of the cutting insert as viewed in a direction of arrow XIV in FIG. 12.

As illustrated in FIG. 14, side surface 6 includes a second side portion 62 continuous with main cutting edge 23. Main cutting edge 23 has a first main cutting edge portion 23a and a second main cutting edge portion 23b. First main cutting edge portion 23a is on a corner cutting edge side with respect to second main cutting edge portion 23b. Second main cutting edge portion 23b is continuous with first main cutting edge portion 23a. Second main cutting edge portion 23b is on a side opposite to corner cutting edge 33 with respect to first main cutting edge portion 23a. First main cutting edge portion 23a is positioned between second main cutting edge portion 23b and corner cutting edge 33.

As illustrated in FIG. 14, when viewed in a direction perpendicular to second side portion 62, an inclination angle θ5 of first main cutting edge portion 23a with respect to a straight line 1c parallel to reference surface 1 is greater than an inclination angle θ6 of second main cutting edge portion 23b with respect to a straight line 1d parallel to reference surface 1. In other words, when viewed in the direction perpendicular to second side portion 62, main cutting edge 23 has an inflection point where inclination of main cutting edge 23 changes. A boundary portion 23c between first main cutting edge portion 23a and second main cutting edge portion 23b is the inflection point. Inclination angle θ5 of first main cutting edge portion 23a with respect to straight line 1a parallel to reference surface 1 may be, for example, greater than or equal to 10° and less than or equal to 60°, or may be greater than or equal to 15° and less than or equal to 55°. As illustrated in FIG. 14, second main cutting edge portion 23b extends such that the height in the direction perpendicular to reference surface 1 is lower as the distance from boundary portion 23c between first main cutting edge portion 23a and second main cutting edge portion 23b increases. A distance E between boundary portion 23c between first main cutting edge portion 23a and second main cutting edge portion 23b and a lowermost position 23d of main cutting edge 23 in the direction perpendicular to reference surface 1 is greater than or equal to 0.04 mm and less than or equal to 0.5 mm.

Figure 15:
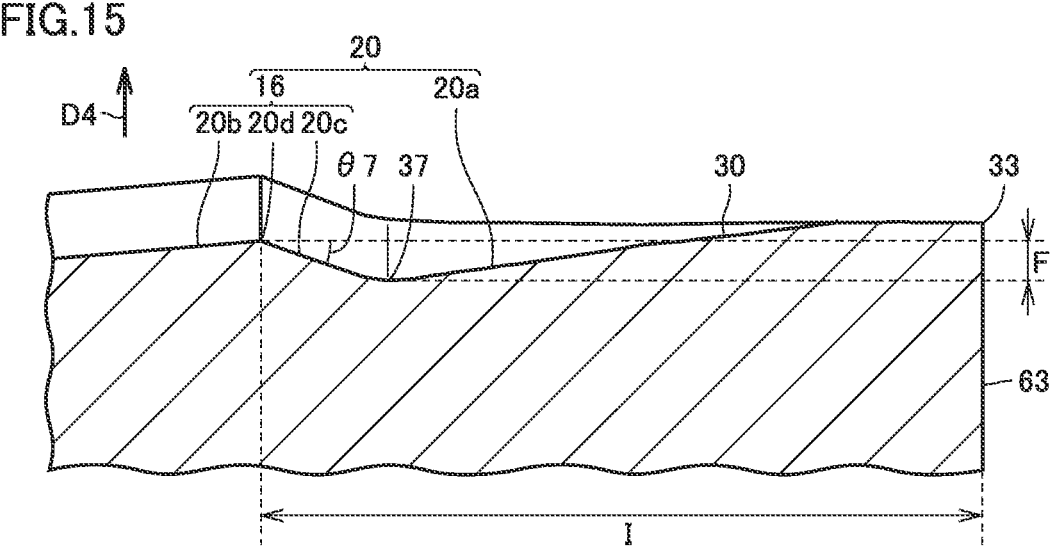
FIG. 15 is a schematic cross-sectional view taken along line XV-XV in FIG. 12, as viewed in the direction of arrows.

FIG. 15 is a cross section passing through a middle point MP (see FIG. 12) between a first end portion C1 and a second end portion C2 in a direction parallel to flat drag 13, the cross section being parallel to main cutting edge 23. As illustrated in FIG. 15, second rake surface portion 20 has a first area 20a, a second area 20b, and a rising surface 20c. First area 20a is continuous with a third rake surface portion 30. Second area 20b is located on a side opposite to a third rake surface portion 30 with respect to first area 20a. First area 20a is located between second area 20b and third rake surface portion 30. Second step portion 16 rising from first area 20a and continuous with second area 20b is provided on second rake surface portion 20. Second step portion 16 is defined by a rising surface 20c and second area 20b continuous with rising surface 20c. In a cross section of FIG. 15, a distance I between second step portion 16 and corner cutting edge 33 in a direction parallel to reference surface 1 is, for example, 1.5 mm. Note that more specifically, distance I between second step portion 16 and corner cutting edge 33 is a distance between a boundary portion 20d between rising surface 20c and second area 20b and corner cutting edge 33. Distance I between second step portion 16 and corner cutting edge 33 may be greater than distance L (see FIG. 8) between first step portion 2 and second end portion C2.

As illustrated in the cross section of FIG. 15, first area 20a extends such that the height in a direction D4 perpendicular to reference surface 1 lowers as the distance from corner cutting edge 33 increases. Rising surface 20c extends such that the height in direction D4 perpendicular to reference surface 1 becomes higher as the distance from corner cutting edge 33 increases. Second area 20b extends such that the height in direction D4 perpendicular to reference surface 1 lowers as the distance from corner cutting edge 33 increases. In the cross section illustrated in FIG. 15 (that is, a cross section passing through middle point MP and parallel to main cutting edge 23), a height F of second step portion 16 in direction D4 perpendicular to reference surface 1 is, for example, greater than or equal to 0.04 mm and less than or equal to 0.5 mm. Height F of second step portion 16 is a distance between a lowermost position 37 of second rake surface portion 20 and boundary portion 20d between rising surface 20c and second area 20b in direction D4 perpendicular to reference surface 1. An inclination angle θ7 of rising surface 20c of second step portion 16 with respect to a plane parallel to reference surface 1 is, for example, greater than or equal to 10° and less than or equal to 60°.

Figure 16:
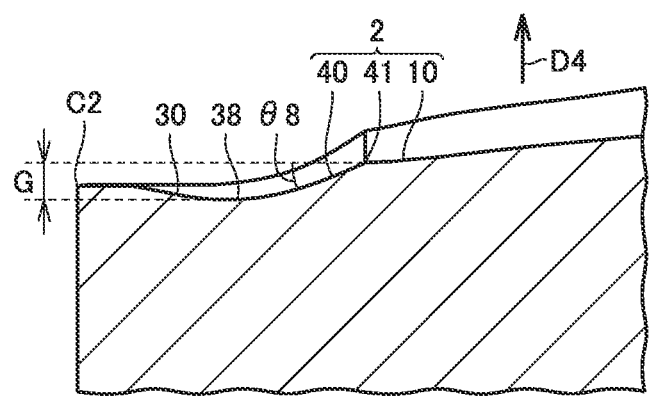
FIG. 16 is a schematic cross-sectional view taken along line XVI-XVI in FIG. 12, as viewed in the direction of arrows.

FIG. 16 is a cross section passing through second end portion C2 and parallel to flat drag 13. As illustrated in FIG. 16, first step portion 2 rising from third rake surface portion 30 and continuous with first rake surface portion 10 is provided on rake surface 9. First step portion 2 is defined by rising surface 40 and first rake surface portion 10 continuous with rising surface 40. In the cross section of FIG. 16, first rake surface portion 10 becomes monotonically higher as the distance from second end portion C2 increases. Inclination angle θ7 (see FIG. 15) of rising surface 20c of second step portion 16 with respect to a plane parallel to reference surface 1 may be smaller than an inclination angle θ8 (see FIG. 16) of rising surface 40 of first step portion 2 with respect to a plane parallel to the reference surface. A height G of first step portion 2 in direction D4 perpendicular to reference surface 1 is, for example, greater than or equal to 0.04 mm and less than or equal to 0.5 mm. Height G of first step portion 2 is a distance between a lowermost position 38 of third rake surface portion 30 and a boundary portion 41 between rising surface 40 and first rake surface portion 10 in direction D4 perpendicular to reference surface 1. Inclination angle θ8 of rising surface 40 of first step portion 2 with respect to the plane parallel to reference surface 1 is, for example, greater than or equal to 10° and less than or equal to 60°.

Next, operation and effects of cutting insert 100 according to the present embodiment will be described.

In cutting insert 100 according to the present embodiment, first step portion 2 works so as to prevent chip 102 from being discharged in the vicinity of corner cutting edge 33. Therefore, discharge speed V1 of part of the chip in the vicinity of corner cutting edge 33 is lower than discharge speed V2 of part of the chip in the vicinity of main cutting edge 23. As a result, the discharge direction of chip 102 is a direction D1 including a vector component in the inner circumferential direction of the milling cutter body. Therefore, it is possible to reduce the likelihood that chip 102 will come into contact with (machined) side surface 72 of workpiece 70 after machining.

In addition, in cutting insert 100 according to the present embodiment, it is possible to reduce the likelihood that chip 102 will come into contact with an (unmachined) upper surface 73 of workpiece 70 (before machining). As a result, it is possible to reduce the likelihood that a scratch mark will remain on upper surface 73. Further, since it is possible to reduce the likelihood that chip 102 will come into contact with side surface 72, chip 102 is discharged satisfactorily. As a result, it is possible to reduce the likelihood that chip 102 will come into contact with a bottom surface 71 of workpiece 70, that is, a surface machined by the flat drag. As a result, it is possible to reduce the likelihood that a scratch mark will be formed on bottom surface 71 of workpiece 70. Furthermore, it is possible to reduce the likelihood that chip 102 will come into contact with side surface 6 of cutting insert 100. As a result, it is possible to reduce the likelihood that a scratch mark will be formed on side surface 6 of cutting insert 100.

The embodiments disclosed herein are examples in all respects and should not be considered to be restrictive. The scope of the present invention is indicated not by the above description but by the claims, and is intended to include meaning of the claims and equivalent thereof, and all changes within the scope.

REFERENCE SIGNS LIST

1: reference surface, 2: first step portion, 3: cutting edge, 4: fourth inclined surface, 5: first surface, 6: side surface, 7: second surface, 8: through hole, 9: rake surface, 10: first rake surface portion, 11: first inclined surface, 12: first land surface, 13: flat drag, 13a: first flat drag portion, 13b: second flat drag portion, 13c: boundary portion, 14: central portion, 15: connecting portion, 16: second step portion, 20: second rake surface portion, 20a: first area, 20b: second area, 20c: rising surface, 20d: boundary portion, 21: second inclined surface, 22: second land surface, 23, 123: main cutting edge, 23a: first main cutting edge portion, 23b: second main cutting edge portion, 23c: boundary portion, 23d, 37, 38: lowermost position, 24, 36, 41: boundary portion, 25: fifth inclined surface, 30: third rake surface portion, 31: third inclined surface, 32: third land surface, 33: corner cutting edge, 40: rising surface, 41: boundary portion, 42: top surface, 43: sixth inclined surface, 61: first side portion, 62: second side portion, 63: third side portion, 70: workpiece, 71: bottom surface, 72: side surface, 73: upper surface, 100: cutting insert, 101: milling cutter body, 102: chip, A: rotation direction, B: movement direction, C1: first end portion, C2: second end portion, MP: middle point, V1, V2: discharge speed

The invention claimed is:

1. A cutting insert comprising:
a first surface;
a second surface located opposite to the first surface; and
a side surface continuous with both the first surface and the second surface,
wherein
a ridge line between the first surface and the side surface includes a cutting edge,
the first surface has a rake surface continuous with the cutting edge, and a reference surface located on a side opposite to the cutting edge with respect to the rake surface and having a planar shape,
the cutting edge has a corner cutting edge, a flat drag continuous with a first end portion of the corner cutting edge, and a main cutting edge continuous with a second end portion of the corner cutting edge, the second end portion being located opposite to the first end portion,
the rake surface has a first rake surface portion continuous with the flat drag, a second rake surface portion continuous with the main cutting edge, and a third rake surface portion continuous with the corner cutting edge and located between the first rake surface portion and the second rake surface portion,
the first rake surface portion has a first inclined surface inclined at a first angle with respect to the reference surface,
the second rake surface portion has a second inclined surface inclined at a second angle greater than the first angle with respect to the reference surface,
the first angle and the second angle are positive angles with respect to the reference surface,
the first end portion and the second end portion are higher than the reference surface in a direction perpendicular to the reference surface, and the main cutting edge extends so as to intersect the reference surface when viewed in a direction parallel to the reference surface, and
a first step portion rising from the third rake surface portion and continuous with the first rake surface portion is provided on the rake surface.

2. The cutting insert according to claim 1, wherein a height of the first step portion in the direction perpendicular to the reference surface is greater than or equal to 0.04 mm and less than or equal to 0.50 mm in a cross section passing through the second end portion and parallel to the flat drag.

3. The cutting insert according to claim 2, wherein a distance between the first step portion and the second end portion in a direction parallel to the reference surface in the cross section is greater than or equal to 0.4 mm and less than or equal to 5.0 mm.

4. The cutting insert according to claim 1, wherein entirety of the first rake surface portion constitutes the first step portion.

5. The cutting insert according to claim 1, wherein a central portion of the flat drag is higher than the first end portion in the direction perpendicular to the reference surface.

6. The cutting insert according to claim 1, wherein the first angle is greater than or equal to 3° and less than or equal to 30°.

7. The cutting insert according to claim 1, wherein the second angle is greater than or equal to 3° and less than or equal to 30°.

8. The cutting insert according to claim 1, wherein
the side surface includes a first side portion continuous with the flat drag,
the flat drag has a first flat drag portion located closer to the corner cutting edge, and a second flat drag portion continuous with the first flat drag portion, and
an inclination angle of the first flat drag portion with respect to a straight line parallel to the reference surface is greater than an inclination angle of the second flat drag portion with respect to a straight line parallel to the reference surface when viewed in a direction perpendicular to the first side portion.

9. The cutting insert according to claim 1, wherein
the second rake surface portion has a first area continuous with the third rake surface portion and a second area located on a side opposite to the third rake surface portion with respect to the first area, and
a second step portion rising from the first area and continuous with the second area is provided on the second rake surface portion.

10. The cutting insert according to claim 9, wherein a height of the second step portion in the direction perpendicular to the reference surface is greater than or equal to 0.04 mm and less than or equal to 0.5 mm in a cross section passing through a middle point between the first end portion and the second end portion in a direction parallel to the flat drag, the cross section being parallel to the main cutting edge.

11. The cutting insert according to claim 9, wherein an inclination angle of a rising surface of the second step portion with respect to the reference surface is greater than or equal to 10° and less than or equal to 60°.

12. The cutting insert according to claim 9, wherein an inclination angle of a rising surface of the second step portion with respect to the reference surface is smaller than an inclination angle of a rising surface of the first step portion with respect to the reference surface.

13. The cutting insert according to claim 1, wherein
the side surface includes a second side portion continuous with the main cutting edge,
the main cutting edge has a first main cutting edge portion located closer to the corner cutting edge, and a second main cutting edge portion continuous with the first main cutting edge portion, and
an inclination angle of the first main cutting edge portion with respect to a straight line parallel to the reference surface is greater than an inclination angle of the second main cutting edge portion with respect to a straight line parallel to the reference surface when viewed in a direction perpendicular to the second side portion.

* * * * *